United States Patent [19]

Feinblum

[11] Patent Number: 5,302,364
[45] Date of Patent: Apr. 12, 1994

[54] PROCESS FOR THE PREPARATION OF AMORPHOUS SILICA

[75] Inventor: Ephraim Feinblum, Beer Sheva, Israel

[73] Assignee: R & D Silicate Products, Ltd., Beer Sheva, Israel

[21] Appl. No.: 996,638

[22] Filed: Dec. 24, 1992

[30] Foreign Application Priority Data

Dec. 25, 1991 [IL] Israel ................................. 100503

[51] Int. Cl.$^5$ .............................................. C01B 33/12
[52] U.S. Cl. .................................. 423/340; 134/2; 501/141
[58] Field of Search ............... 423/335, 340; 501/141, 501/149; 134/2, 3

[56] References Cited

U.S. PATENT DOCUMENTS

| 4,401,638 | 8/1983 | Caballero et al. | 423/340 |
| 4,804,422 | 2/1989 | Papanikolau et al. | 134/28 |
| 4,818,510 | 4/1989 | Jung | 423/335 |
| 4,952,246 | 8/1990 | Seeley | 134/3 |
| 4,956,509 | 9/1990 | Englisch et al. | 204/130 |
| 5,037,625 | 8/1991 | Loritsch et al. | 423/340 |
| 5,102,837 | 4/1992 | Balkany et al. | 501/141 |

FOREIGN PATENT DOCUMENTS

| 2078703 | 1/1982 | United Kingdom | 423/340 |
| 8401567 | 4/1984 | World Int. Prop. O. | 423/340 |

Primary Examiner—Olik Chaudhuri
Assistant Examiner—Ken Horton
Attorney, Agent, or Firm—Jacobson, Price, Holman & Stern

[57] ABSTRACT

The invention provides a process for the production of a high grade amorphous silica having a purity of at least 90% active silica of the formula $SiO_2.nH_2O$, comprising the steps of:

a. comminuting and wet classification of porcellanite rock to form granules having an average diameter of 200 microns to 8 mm;

b. combining the resulting granules with NaOH at a temperature of up to 100° C. to form a product containing sodium silicates;

c. separating a liquid containing the sodium silicates from solid waste;

d. adding $CO_2$ to the liquid product to form $SiO_2.nH_2O$ and $Na_2CO_3$;

e. washing the resulting product to effect a separation of the precipitated $SiO_2.nH_2O$ from the soluble $Na_2CO_3$; and f. recovering $SiO_2.nH_2O$ of a purity of at least 90%.

7 Claims, 1 Drawing Sheet

PROCESS FOR THE PREPARATION OF AMORPHOUS SILICA

The present invention relates to a process for the preparation of high grade amorphous silica.

BACKGROUND OF THE INVENTION

Porcellanite is a natural mineral raw material found in the earth in scarce quantities. It occurs in the coastal regions of different countries but also in rare dispersions in semi-closed basins such as Israel.

The porcellanite rock contains as basic and useful component, the so-called opal-CT, having the formula $SiO_2.nH_2O$ wherein n is between 0.1 and 0.3, which is a crystalline polymorf of $SiO_2$ including $H_2O$ in its network.

There were identified some special properties of this mineral matter which favorably differentiates it from quartz-sand with similar chemical composition ($SiO_2$). First of all, this opaliform silica is highly reactive and thus can be easily dissolved in alkaline hydroxides (by hydrothermal process at low temperature and overpressure). In addition, this opaliform mineral is a crypto-crystalline form of silica (cristobalite or tridymite) with microscopic pores, large pore volumes and surface area, attributes which provide significant adsorptive capacity and related properties to this rare form of silica.

A prevailing prerequisite of rendering profitable this useful mineral substance is the need to obtain the same in relatively high purity.

Exploration samples of the Israeli porcellanite occurrence indicate contents of opal (active silica) in the range of 20-65%. Accompanying mineral impurities are: limestone-calcite ($CaCO_3$) amounting to 25-60%, flint ($SiO_2$) and about 4-15%, and clays, limonitic iron oxides, quartz-sand, and other impurities as subordinate components (3-4%).

There are many potential uses, both direct and indirect, for opaliform active silica, however, all of them require a product purity of at least 85% and some require a purity of at least 90 or even 95%.

Thus some of the direct utilizations of opaliform active silica include:

a. Silica bricks (for open-hearth furnaces).
b. Specialty glasses (for optical purposes).
c. Laboratory glassware.
d. Silica fibers (in precision instruments).
e. Pyrogenic or fumed silica.
f. Filler and reinforcing material (in rubber, paints, etc.).
g. Sodium silica (water glass).

Some of the e.g, indirect utilizations of sodium silicate include:

a. Silica gel (catalyst, adsorbent filtering material, dehydrating agent).
b. Detergent (in detergents and soap industry).
c. Adhesive (adhesion to glass, wood, metal and paper).
d. Binder (forming bricks or moulded objects).
e. Zeolites and insoluble silicates (various uses).
f. Oil recovery (enhancing oil flow in porous substances).

It is to be noted, however, that the projected prerequisite content of "active silica" for various applications are as follows:

a. Silica gels (96-99%) below this content have unsatisfactory surface area.
b. Precipitated silica (95%) to achieve a minimum surface area of 40-45 $m^2/g$.
c. Pyrogenic silica (97-99%.9%) to enable the manufacture of pyrogenic silica.
d. Silica bricks (light weight aggregates) (92-95%) to obtain bulk density of 0.7-0.9 $g/cm^3$.
e. Oil recovery (88-95%) to ensure an oil absorption capacity of 1-3 g/g.
f. Detergents (86-92%) to avoid deleterious effect of impurities (mainly $CacO_3$).

SUMMARY OF THE INVENTION

According to the present invention there is now provided a process for the production of a high grade amorphous silica having a purity of at least 90% active silica of the formula $SiO_2.nH_2O$, comprising the steps of:

a. comminuting and wet classification of porcellanite rock to form granules having an average diameter of 200 microns to 8 mm;

b. combining the resulting granules with NaOH at a temperature of up to 100° C. to form a product containing sodium silicates such as $Na_2O.nSiO_2$;

c. separating a liquid containing sodium silicates from solid waste;

d. adding $CO_2$ to said liquid product to form $SiO_2.nH_2O$ and $Na_2CO_3$;

e. washing the resulting product to effect a separation of the precipitated $SiO_2.nH_2O$ from the soluble $Na_2CO_3$; and f. recovering ($SiO_2.nH_2O$) of a purity of at least 90%.

DETAILED DESCRIPTION OF THE INVENTION

In U.S. Pat. No. 5,102,837 and corresponding European Application 90309905.9 published 3.4.91 under publication number 0420437 there is described and claimed a process for the production of a high grade opaliform porcellanite having a purity of at least 80% active silica comprising grinding and screening porcellanite rock to form granules having an average diameter of between about 0.6 and 18 mm and then subjecting said granules to wet disintegration to remove soft clays and limestone and gravitic separation to separate the lower density opaliform active silica from higher density impurities intermixed therewith.

As will be noted, said process is different from that of the present invention, however, in addition it has been found that active silica produced according to the chemical process of the present invention, has a greater surface area and is amorphous.

The process of the present invention is also very economical in its preferred embodiments in that $Na_2CO_3$ containing liquid from step e is recycled for reuse of the sodium values thereof in step b.

Figure 1:
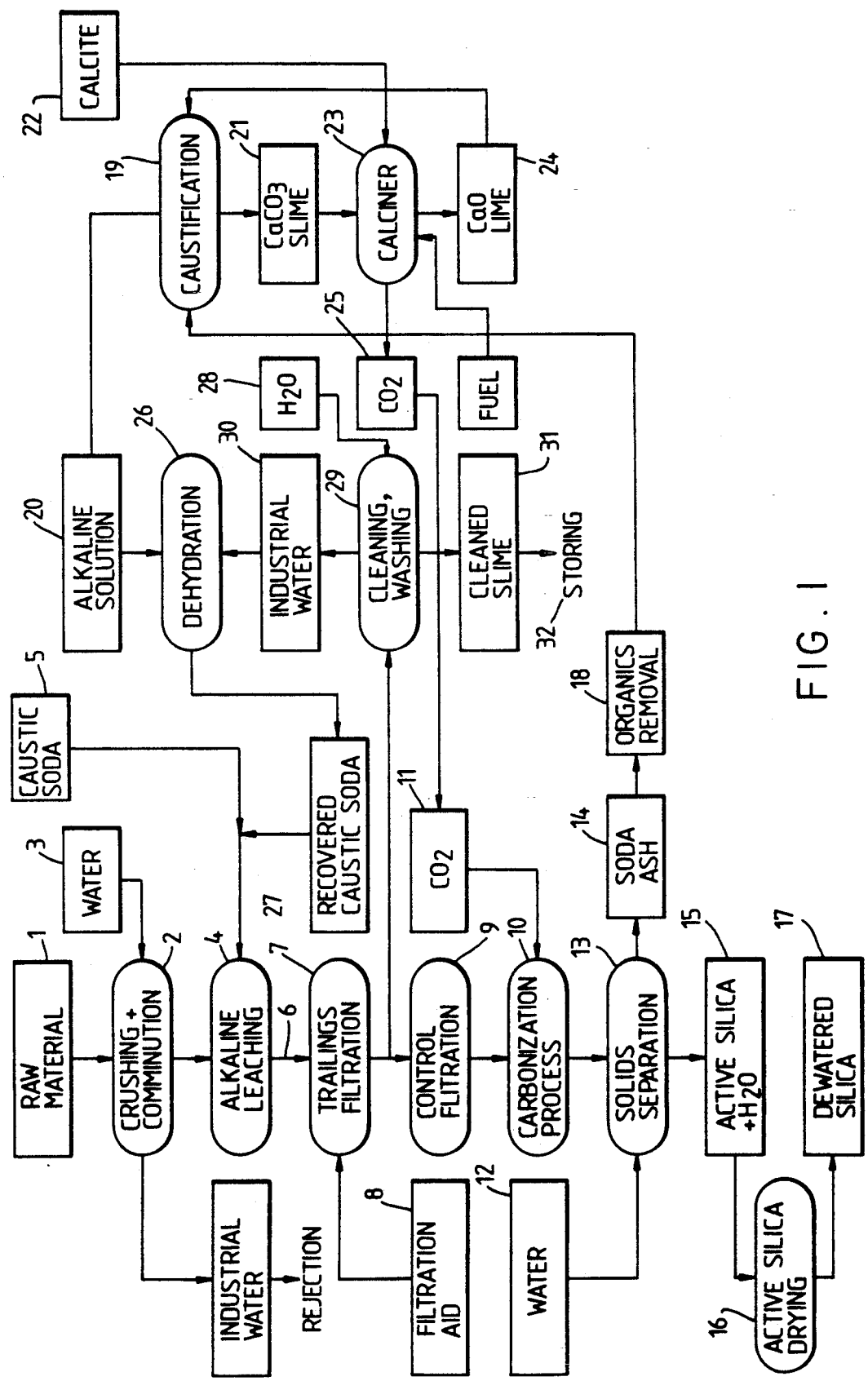
FIG. 1 represents the invention process according to example 2.

Preferably said liquid is first subjected to oxidation to remove organic impurities therefrom and after oxidation. said liquid is subjected to caustification to produce NaOH.

In said preferred process $CaCO_3$ is produced as a waste product of said caustification which $CaCO_3$ is then heated to produce CaO and $CO_2$, said CaO being recycled for use in said caustification step and said $CO_2$ is recycled for use in step e of said process.

Thus e.g., a raw porcellanite rock sample was collected from the mine and analyzed.

The chemical composition of the raw material was found by wt % to be:

$SiO_2$—50; CaO—21.0; $Al_2O_3$—1.6; $Fe_2O_3$—0.8; S—0.5; Cl—4.0; $CO_2$—11.7; $P_2O_5$—1.3; $TiO_2$—0.1; others.

After processing according the present inVention there was obtained a precipitated form of active silica of high purity which analyzed as having the following chemical composition by wt %:

$SiO_2$—87.7%; $H_2O$ hydr. (pp)—7.1%; $Na_2O$—3.6%; $Al_2O_3$—0.68%; the rest traces as well as liquid glass ($SiO_2/Na_2O$—2/3) and calcium metasilicate ($CaO.SiO_2$).

While the invention will now be described in connection with certain preferred embodiments in the following examples and with reference to the attached flow sheet so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

Starting with 1000 kg. of raw porcellanite rock having silica content of 50% $SiO_2$ the following process stages were carried out:

a. The rock is subjected to crushing and grinding processes in crushers and cone breakers working with an inflow of water. The resulting material has a size range between 8 to 0.2 mm. Optionally, if the porcellanite is found to contain water soluble salts such as $CaCl_2$, NaCl, $Na_2SO_4$ and $MgCl_2$ these salts are washed out from the solids.

b. The resulting material undergoes a leaching process in a steel lined reactor with a caustic soda (NaOH) solution at a temperature up to 100° C., under vivid agitation, and at an atmospheric pressure, yielding a sodium silicate solution $Na_2O.nSiO_2$) which is separated from the solid waste by filtration on a vacuum filter in the presence of a calcium containing filtration aid.

c. The sodium silicate solution is carbonized in vessels equipped with stirring devices with $CO_2$ to yield an amorphous form of silica gel ($SiO_2.nH_2O$) and sodium carbonate solution, the two components being separated by filtration and clean-washing.

d. The separated silica gel is dried in kilns and a final product of about 400 kg. having a 97% purity is obtained.

The following example is intended to be read in conjunction with the attached flow sheet and illustrates a preferred commercial process in which the by-products are in a large extent recycled for a more commercial process.

EXAMPLE 2

The process of example 1 is repeated with the following modifications:

a. Raw material 1 is subjected to crushing comminution in crushers 2 with an inflow of water 3. The resulting material undergoes a leaching process in reactor 4 to which is added a caustic soda solution 5. The resulting sodium silicate solution 6 is separated from solid waste by filtration in a vacuum filter 7 in the presence of a calcium containing filtration aid 8. The remaining sodium silicate solution entrapped in the solid waste is recovered by a further control filtration on filter 9. The sodium silicate solution is then carbonized in vessels 10 by the addition of $CO_2$ 11 from the source described hereinafter, to form a precipitated silica gel and sodium carbonate solution.

Water 12 is added to effect the separation by filtration on filters 13, of the solid and liquid phases, whereby the soda ash containing liquid 14 is recycled as described hereinafter, for reuse of sodium values therein. The active silica gel 15 is subjected to a drying in a kiln 16 to obtain the product 17.

As stated, the soda ash ($Na_2CO_2$) containing solution 14 is recycled by first subjecting said liquid to a stage 18 for removal of organic impurities such as oxidation and is then subjected to causification 19 to produce sodium hydroxide 20 and a calcium carbonate containing slime 21. Said slime is mixed with limestone (calcite) 22 in a calcining furnace 23 at a temperature of at least 600° to produce a CaO (lime) 24 which is recycled to the caustification circuit 19.

The calciner also produces $CO_2$ which is collected in reservoir 25 and delivered to the carbonization process 10.

The sodium hydrate solution 20 produced by the caustification process is subjected to dehydration 26 with steam and the recovered dehydrated caustic soda 27 is combined with the fresh caustic soda 5 and recycled to the leaching process in reactor 4.

The solid tailings from the filters 7 can be washed with industrial water 28 in a cleaning elutriator 29 and the industrial water 30 which contains sodium values is added to alkaline solution 20 which is subjected to dehydration 26. The cleaned waste product 31 can be sent to storage 32 for potential use.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A process for the production of a high grade amorphous silica having a purity of at least 90% active silica of the formula $SiO_2.nH_2O$, comprising the steps of:

a. comminuting and wet classification of porcellanite rock to form granules having an average diameter of 200 microns to 8 mm;

b. combining the resulting granules with NaOH temperature of up to 100° C. to form a product containing sodium silicates;

c. separating a containing said silicates from solid waste;

d. adding $CO_2$ to said liquid product to form $SiO_2 \cdot nH_2O$ and $Na_2CO_3$;

e. washing the resulting product to effect a separation of the precipitated $SiO_2 \cdot nH_2O$ from the soluble $Na_2CO_3$; and f. recovering $SiO_2 \cdot nH_2O$ of a purity of at least 90%.

2. A process according to claim 1 wherein $Na_2CO_3$ containing liquid from step e is recycled for reuse of the sodium values thereof in step b.

3. A process according to claim 2 wherein said liquid is first subjected to oxidation to remove organic impurities therefrom.

4. A process according to claim wherein after oxidation said liquid is subjected to caustification to produce NaOH.

5. A process according to claim 4 wherein $CaCO_3$ is produced as a waste product of said caustification which $CaCO_3$ then heated to produce CaO and $CO_2$, said CaO being recycled for use in said caustification step and said $CO_2$ is recycled for use in step d of said process.

6. A process according to claim 1 further comprising washing the granules formed in step a to remove water soluble salts including $CaCl_2$ NaCl, $Na_2SO_4$ and $MgCl_2$.

7. A process according to claim 1 wherein said liquid containing sodium silicates is separated from solid waste by filtration in the presence of a calcium containing filtration aid.

* * * * *